W. BROWN.
SPRAYING MACHINE.
APPLICATION FILED JULY 11, 1921.

1,433,174.

Patented Oct. 24, 1922.
2 SHEETS—SHEET 1.

INVENTOR.
WILLIAM BROWN.
BY HIS ATTORNEY.
James F. Williamson

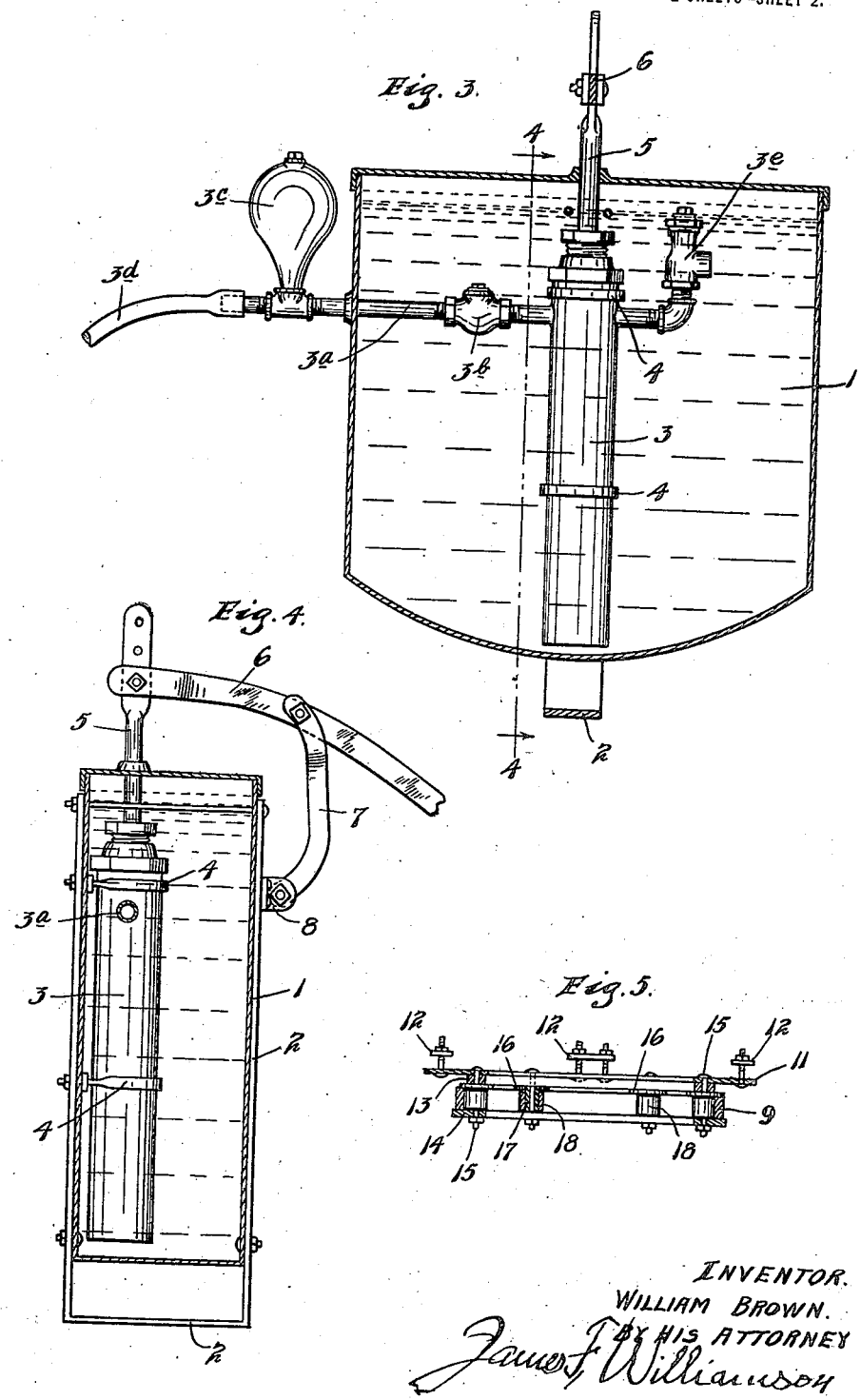

Patented Oct. 24, 1922.

1,433,174

UNITED STATES PATENT OFFICE.

WILLIAM BROWN, OF OSAKIS, MINNESOTA.

SPRAYING MACHINE.

Application filed July 11, 1921. Serial No. 483,684.

*To all whom it may concern:*

Be it known that I, WILLIAM BROWN, a citizen of the United States, residing at Osakis, in the county of Douglas and State of Minnesota, have invented certain new and useful Improvements in Spraying Machines; and I do hereby declare the following to be a full, clear, and exact description of the invention, such as will enable others skilled in the art to which it appertains to make and use the same.

This invention relates to a cultivator sprayer or sprayer that is adapted to be attached to the frame of a cultivating implement, which sprayer is provided with a pump which is actuated by movement of the cultivator wheels.

It is an object of this invention to provide an improved and simple means attachable to the cultivator wheel for operating the sprayer pump.

It is a further object of the invention to provide a sprayer with a reciprocating pump and with improved operating means therefor adapted to be connected to the actuated means attached to the wheel.

These and other objects of the invention will be fully set forth in the following description, made in connection with the accompanying drawings in which like reference characters refer to the same parts throughout the different views, and in which Fig. 1 is a rear view of one side of the cultivator showing the sprayer attached thereto;

Fig. 3 is a longitudinal section of the spraying device on an enlarged scale;

Fig. 4 is a transverse section of said device taken on the line 4—4 of Fig. 3; and Fig. 5 is a central horizontal section of the actuating means which is attached to the cultivator wheel.

Figure 1:
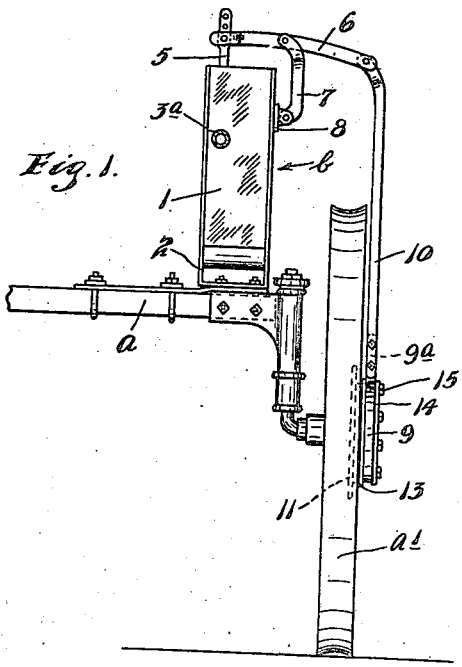
Figure 2:
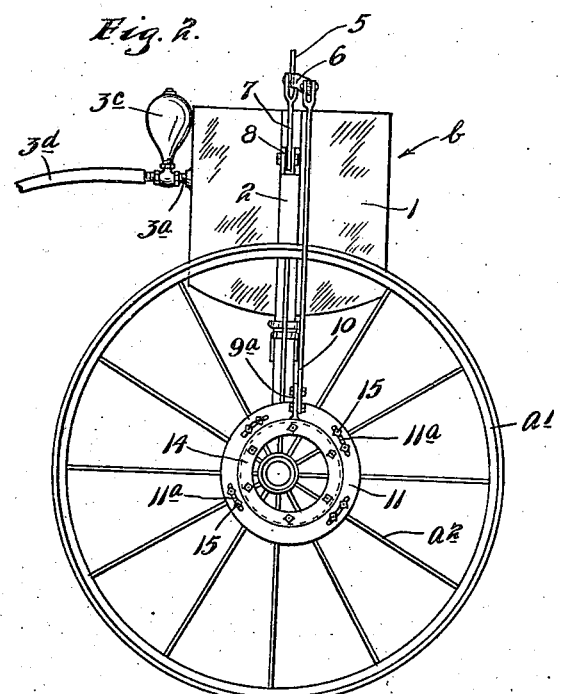
Fig. 2 is a view in side elevation of the cultivator wheel and frame showing the sprayer attached thereto.

Referring to the drawings, a portion of the frame of the cultivator of any standard type is shown as $a$, to which is connected the wheel $a^1$. The sprayer device, designated generally as $b$ comprises a tank 1 which is adapted to receive the spraying liquid and which is of general rectangular shape with a curved bottom portion. A U-shaped bracket 2 extends upwardly substantially centrally of the sides of the tank 1 and is spaced therefrom in its bottom portion, which bracket forms the attaching means for securing the tank to the cultivator frame, as clearly illustrated in Fig. 1.

A pump 3 is secured in the tank 1 by clips 4 which embrace the same and have their threaded ends projecting outwardly through the tank and through the bracket 2 to which they are secured by clamping nuts threaded on said ends. The pump 3 is of a reciprocating type and is provided with a plunger member 5 flattened at its upper end and provided with a plurality of holes for the adjustable attachment of an operating lever 6. The lever 6 is provided with a bifurcated head embracing the end of the plunger 5 and provided with apertures through which, and one of the apertures in the plunger 5, passes a headed and nutted bolt for securing the parts together. The lever 6 is fulcrumed to link 7 which is provided with a forked end to receive the same, and the other end of the link 7 is pivotally attached to a small bracket 8 secured near the upper end of bracket 2.

The pump 3 is provided with an inlet at the lower end thereof and is also provided with an outlet pipe $3^a$ equipped with the usual check valve $3^b$ and an expansion chamber $3^c$, the liquid being sprayed out through a hose connection $3^d$ in the usual manner. The pump is also provided with a pressure relief conduit and valve $3^e$. These parts are of the usual standard construction and such as are usually provided in such an apparatus.

In order to operate the pump, a ring member 9 is provided, which ring has an upstanding arm or lug $9^a$ to which is rigidly bolted the lower end of an operating arm 10 which extends upwardly along the wheel $a^1$ of the cultivator and has a forked upper end which receives and is pivotally attached to the outer end of the lever 6. A ring 11 of flat material of somewhat larger diameter than the ring 9 having a plurality of circumferentially extending and spaced slots $11^a$ therein, is bolted to the wheel $a^1$ by pairs of headed and nutted bolts extending through the slots $11^a$ and at each side of the arms $a^2$ of the wheel $a^1$ the nutted ends of the bolt passes through short apertured bars 12, thus clamping the ring 11 to the side of the wheel in position to surround the hub thereof but being eccentrically arranged relatively to said hub.

A ring 13 is secured to the outer side of the ring 11 adjacent the opening therein and another ring 14 is bolted to the rings 11 and 13 by circumferentially spaced bolts 15 having their heads disposed on the inner side of the ring 11 and extending outwardly through the ring 13 and through washers 16 and sleeves 17 placed between the rings 13 and 14. The outer ends of the bolts project through the ring 14 and are provided with nuts which are tightened to firmly clamp the rings 11, 13 and 14 in rigid relation. Loosely mounted on the sleeves 17 are a plurality of rollers 18 and the ring 9, previously described, surrounds these rollers 18 and is disposed between the rings 13 and 14.

The operation of the device is as follows:

When the cultivator is moved the ring 11 being secured rigidly to the wheel will move eccentrically about the center of the same. This eccentric movement will result in the rollers 18 moving the ring 9 eccentrically about the center of the wheel and the operating member 10 will be reciprocated and will reciprocate the lever 6 and the plunger 5 of the pump. The liquid will thus be pumped from the tank by pump 3 and sprayed out through the hose 3ᵈ. The inlet to the pump being at the bottom of the tank, any of the spraying material which may settle to the bottom of the tank will be received therein and mixed with the water and effectively sprayed.

From the above description, it is seen that applicant has provided a simple and improved form of spraying apparatus and one which can be quickly and easily attached to and operated by practically any standard form of cultivator or other farm implement.

It will, of course, be understood that various changes may be made in the form, details and arangement of the device without departing from the scope of applicant's invention, which, generally stated, consists in the matter shown and described and set forth in the appended claims.

What is claimed is:

1. An eccentric structure adapted to be attached to the wheel of a vehicle comprising, an annular member having spaced arcuate slots therethrough, bolts disposed in said slots, plates disposed on said bolts between which and said member the spokes of said wheel are clamped, spaced bolts projecting outwardly from said annular member, a ring carried at the outer end of said last mentioned bolt, rollers journaled about said last mentioned bolts, and an eccentric strap encircling said rollers and operated thereby when said wheel is rotated.

2. The structure set forth in claim 1, and a ring secured adjacent said annular member through which said last mentioned bolts pass, and spacing members surrounding said bolts and contacting said last mentioned ring and the first mentioned ring.

3. An eccentric structure adapted to be attached to the wheel of a vehicle having in combination, an annular member having spaced arcuate slots therethrough, bolts disposed in and projecting inwardly from said slots, plates through which said bolts pass adapted to clamp said member to the spokes of said wheel, spaced bolts extending outwardly from said member, spaced rings through which said last mentioned bolts pass, spacing thimbles on said last mentioned bolts between said rings, washers and rollers on said thimbles, and an eccentric strap member surrounding said rollers and disposed between said washers and the outer one of said spaced rings and operated by said rollers when the wheel is rotated.

In testimony whereof I affix my signature in presence of two witnesses:

WILLIAM BROWN.

Witnesses:
H. R. HALVORSON,
LILLIAN HALVORSON.